United States Patent
Finkelstein et al.

(10) Patent No.: US 11,599,703 B2
(45) Date of Patent: Mar. 7, 2023

(54) CHIP SECURITY VERIFICATION TOOL

(71) Applicant: Mellanox Technologies, Ltd., Yokneam (IL)

(72) Inventors: Dotan Finkelstein, Yokneam (IL); Roman Manevich, Yokneam (IL); Lidiya Ivanitskaya, Yokneam (IL)

(73) Assignee: Mellanox Technologies, Ltd., Yokneam (IL)

( * ) Notice: Subject to any disclaimer, the term of this patent is extended or adjusted under 35 U.S.C. 154(b) by 396 days.

(21) Appl. No.: 16/783,237

(22) Filed: Feb. 6, 2020

(65) Prior Publication Data

US 2021/0248274 A1    Aug. 12, 2021

(51) Int. Cl.
*G06F 30/398* (2020.01)
*G06F 21/72* (2013.01)
*G06F 119/02* (2020.01)

(52) U.S. Cl.
CPC ............ *G06F 30/398* (2020.01); *G06F 21/72* (2013.01); *G06F 2119/02* (2020.01)

(58) Field of Classification Search
CPC .................................................... G06F 30/398
USPC ......................................................... 716/111
See application file for complete search history.

(56) References Cited

U.S. PATENT DOCUMENTS

2019/0347417 A1 *  11/2019  Tehranipoor .......... G06F 21/566

* cited by examiner

*Primary Examiner* — Eric D Lee
(74) *Attorney, Agent, or Firm* — Alston & Bird LLP

(57) ABSTRACT

An apparatus reads a chip design comprising first and second blocks corresponding to first and second hardware modules, nodes, and data path segments that each connect a pair of nodes or a node to a block. Tracing backward along data paths that terminate at the second block, the apparatus identifies a secure cone. The secure cone comprises secure path segments of the data paths terminating at the second block and corresponding nodes. The apparatus identifies data paths originating at the first block and that are at least partially within the secure cone and determines whether any terminate outside the secure cone. When none of the data paths originating at the first block terminate outside the secure cone, the apparatus verifies the chip design. When a data path originating at the first block terminates outside the secure cone, the apparatus determines that the chip design has a potential leak.

20 Claims, 4 Drawing Sheets

CHIP SECURITY VERIFICATION TOOL

TECHNOLOGICAL FIELD

An example embodiment relates generally to hardware cyber security. An example embodiment relates to a tool for use in the design of secure hardware, computer chips, and/or the like.

BACKGROUND

Computer chips with cyber security features store and use cryptographic keys. However, the cryptographic keys are stored in a first hardware module of the chip and are used by a second hardware module of the chip. Thus, the cryptographic keys must be communicated from the first hardware module to the second hardware module. This introduces the possibility of these cryptographic keys being leaked to an untrusted block or hardware module, which means that the cryptographic keys may be exposed to an untrusted external user.

BRIEF SUMMARY OF SOME EXAMPLE EMBODIMENTS

In various embodiments, secure information/data may be communicated from a first hardware module of a computer chip to a second hardware module of a computer chip. During this communication, the secure information/data may be leaked to other hardware modules. This leakage may result in the secure information/data being exposed to untrusted hardware modules and, consequently, untrusted external users. Currently, there is no clear methodology for dealing with secure information/data being communicated between different chip modules to prevent these leaks.

Various embodiments provide a technical solution to the technical problem of designing computer chips that do not include leakage paths and that ensure that secure information/data is not leaked when being communicated between a first hardware module of a computer chip and a second hardware module of a computer chip. In particular, various embodiments provide methods, apparatus, systems, computer program products, and/or the like configured to perform a leak test on a chip design and determine whether any leakage paths exist in the chip design. In various embodiments, a computer chip, also referred to herein as a chip, may be an integrated circuit, a wafer of semiconductor material embedded with integrated circuitry, and/or the like. In various embodiments, the chip is a security chip and/or comprises security elements. For example, the chip may be and/or comprise elements of a flip flop, static random access memory (SRAM), and/or the like, in various embodiments. For example, the chip may comprise a first hardware module that stores secure information/data and a second hardware module that uses the secure information/data to perform one or more functions. For example, the first hardware module may be a vault or other secure storage hardware module. For example, the first hardware module may be a block that securely decrypts a cryptographic key or other secure information/data and/or stores the cryptographic key or other secure information/data within the block. For example, the second hardware module may be a trusted block. In an example embodiment, the second hardware module is a cryptographic engine. A non-limiting example of a cryptographic engine that may be used as the second hardware module in an example embodiment is an AES-GCM. Thus, various embodiments provide an improvement to the technical field of secure chip design and development.

In various embodiments, a chip design is received by an analysis apparatus. For example, the chip design may be a register-transfer level (RTL) design, a netlist design, and/or the like for a chip. In various embodiments, the analysis apparatus is a computing entity, computing device, and/or the like. The analysis apparatus may execute computer program code (e.g., via a processor of the analysis apparatus) to analyze the chip design to identify a secure cone. In an example embodiment, the secure cone is identified by working backward along the data paths of the design from a second block corresponding to the second hardware module to a first block corresponding to the first hardware module and/or until the primary input for the data path is reached. In various embodiments, data paths may include combinational nodes (e.g., gates) and/or sequential nodes (e.g., registers). In various embodiments, the secure cone includes the data paths that terminate at the second block.

After the secure cone has been identified, the analysis apparatus may execute computer program code (e.g., via a processor of the analysis apparatus) to analyze the chip design to identify the data path segments of data paths that originate from the first block. Moreover, the analysis apparatus may execute computer program code (e.g., via a processor of the analysis apparatus) to analyze the chip design to determine whether any data path segments of data paths that originate from the first block exit the secure cone. For example, a data path segment of a data path that originates at the first block and that is at least partially within the secure cone is said to "exit the secure cone" or to be a "leaked path segment" if the data path segment terminates at a node (e.g., logic gate and/or register) located outside of the secure cone. If a data path segment of a data path that originates at the first block and that is at least partially within the secure cone and that exits the secure cone is identified, information/data identifying the leaked path segment is logged.

The analysis apparatus may further execute computer program code (e.g., via a processor of the analysis apparatus) that causes the analysis apparatus to provide a chip design verification responsive to determining that none of the data path segments that originate within the secure cone exit the secure cone. The chip design verification may indicate that no potential leaks were identified in the chip design. Additionally, the analysis apparatus may further execute computer program code (e.g., via a processor of the analysis apparatus) that causes the analysis apparatus to provide a chip design feedback responsive to determining that at least one data path segment that originates within the secure cone exits the secure cone. The chip design feedback may include an indication that potential leaks were identified in the chip design. In an example embodiment the chip design feedback may include the information/data identifying any identified leaked path segment(s). The chip design verification and/or chip design feedback may be provided via a user interface of the analysis apparatus and/or otherwise provided (e.g., emailed, texted, provided via a portal or online dashboard, provided via an interactive user interface of a chip design generation program, and/or the like) such that the chip designer may receive, review, and/or the like the chip design verification and/or the chip design feedback.

According to a first aspect, a method for verifying a chip design for a computer chip is provided. In an example embodiment, the method comprises reading, by an analysis apparatus, a chip design. The chip design comprises a first block corresponding to a first hardware module, a second block corresponding to a second hardware module, a plurality of nodes, and a corresponding plurality of data path segments. Each data path segment connects a pair of nodes or connects a node to one of the first or second blocks. The method further comprises, by tracing backwards along data paths that terminate at the second block, identifying, by the analysis apparatus, a secure cone. The secure cone comprises all data path segments of the data paths that terminate at the second block and any nodes that connect the data path segments of the secure cone. The method further comprises identifying, by the analysis apparatus, data paths that originate at the first block and that are at least partially within the secure cone. The method further comprises determining, by the analysis apparatus, whether any of the data paths that originate at the first block and that are at least partially within the secure cone terminate at a node that is not in the secure cone. The method further comprises responsive to determining that none of the data paths that originate at the first block and are at least partially within the secure cone terminate at a node that is not in the secure cone, determining, by the analysis apparatus, that the chip design is verified; and responsive to determining that at least one of the data paths that originate at the first block and are at least partially within the secure cone terminates at a node that is not in the secure cone, determining, by the analysis apparatus, that the chip design has a potential leak.

According to another aspect, an apparatus for verifying a chip design for a computer chip is provided. In an example embodiment, the apparatus comprises at least one processor and at least one memory storing computer program code. The at least one memory and the computer program code are configured to, with the processor, cause the apparatus to at least read a chip design. The chip design comprises a first block corresponding to a first hardware module, a second block corresponding to a second hardware module, a plurality of nodes, and a corresponding plurality of data path segments. Each data path segment connects a pair of nodes or connects a node to one of the first or second blocks. The at least one memory and the computer program code are further configured to, with the processor, cause the apparatus to, by tracing backwards along data paths that terminate at the second block, identify a secure cone. The secure cone comprises all data path segments of the data paths that terminate at the second block and any nodes that connect the data path segments of the secure cone. The at least one memory and the computer program code are further configured to, with the processor, cause the apparatus to identify data paths that originate at the first block and are at least partially within the secure cone. The at least one memory and the computer program code are further configured to, with the processor, cause the apparatus to determine whether any of the data paths that originate at the first block and are at least partially within the secure cone terminate at a node that is not in the secure cone; responsive to determining that none of the data paths that originate at the first block and that are at least partially within the secure cone terminate at a node that is not in the secure cone, determine that the chip design is verified; and responsive to determining that at least one of the data paths that originate at the first block and that are at least partially within the secure cone terminates at a node that is not in the secure cone, determine that the chip design has a potential leak.

According to still another aspect, a non-transitory, machine-readable storage medium is provided. In an example embodiment, the non-transitory, machine-readable storage medium comprises a plurality of instructions. Execution of the plurality of instructions with a processor of an apparatus, causes the apparatus to read a chip design. The chip design comprises a first block corresponding to a first hardware module, a second block corresponding to a second hardware module, a plurality of nodes, and a corresponding plurality of data path segments. Each data path segment connects a pair of nodes or connects a node to one of the first or second blocks. Execution of the plurality of instructions with a processor of an apparatus, further causes the apparatus to, by tracing backwards along data paths that terminate at the second block, identify a secure cone. The secure cone comprises all data path segments of the data paths that terminate at the second block and any nodes that connect the data path segments of the secure cone. Execution of the plurality of instructions with a processor of an apparatus, further causes the apparatus to identify data paths that originate at the first block and that are at least partially within the secure cone. Execution of the plurality of instructions with a processor of an apparatus, further causes the apparatus to determine whether any of the data paths that originate at the first block and are at least partially within the secure cone terminate at a node that is not in the secure cone; responsive to determining that none of the data paths that originate at the first block and are at least partially within the secure cone terminate at a node that is not in the secure cone, determine that the chip design is verified; and responsive to determining that at least one of the data paths that originate at the first block and are at least partially within the secure cone terminates at a node that is not in the secure cone, determine that the chip design has a potential leak.

BRIEF DESCRIPTION OF THE DRAWINGS

Figure 1:
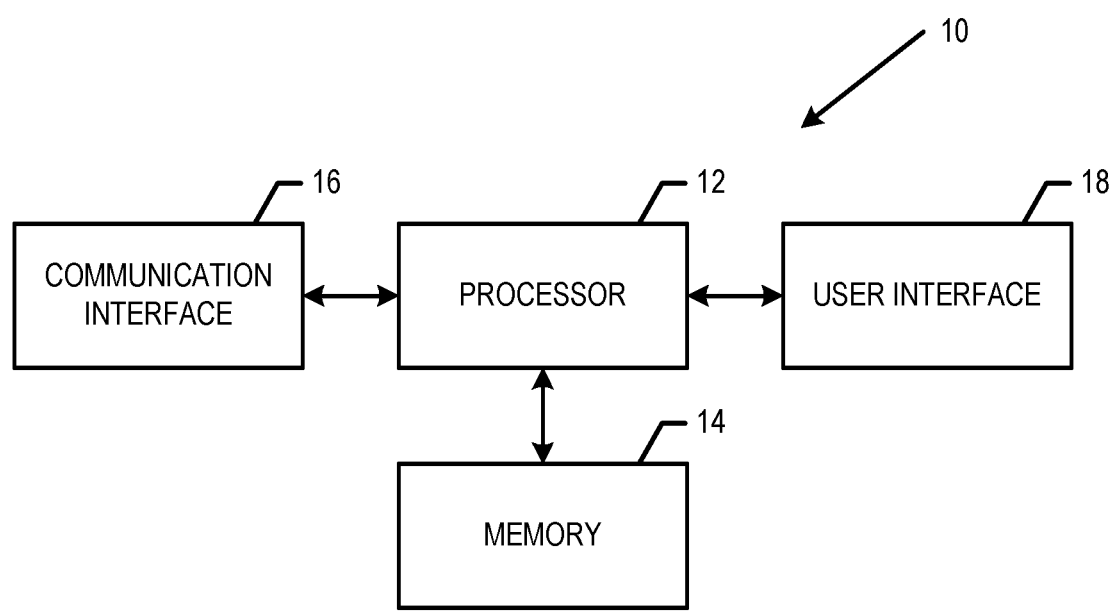
Figure 2A:
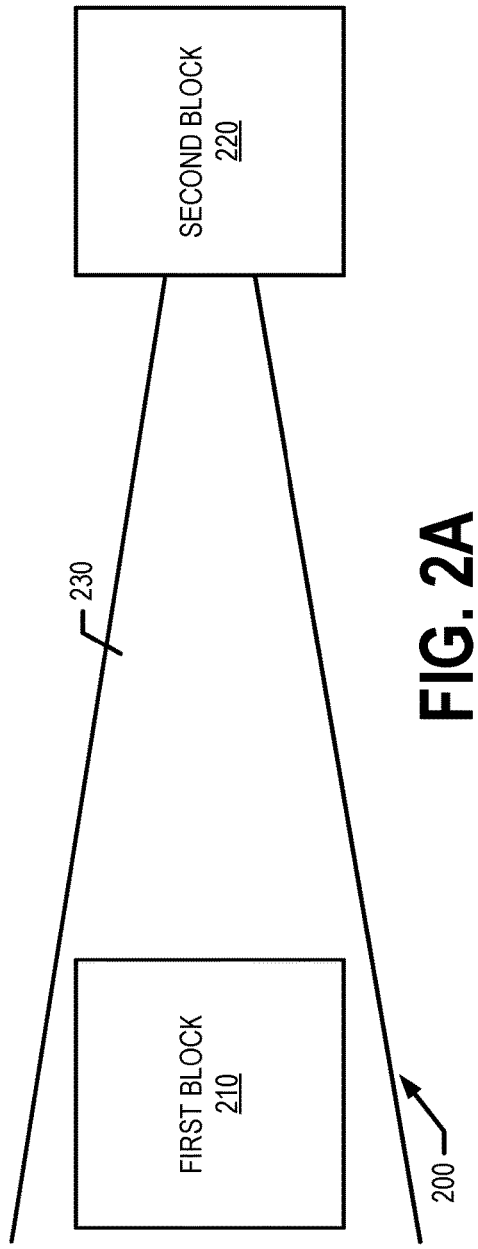
Figure 2B:
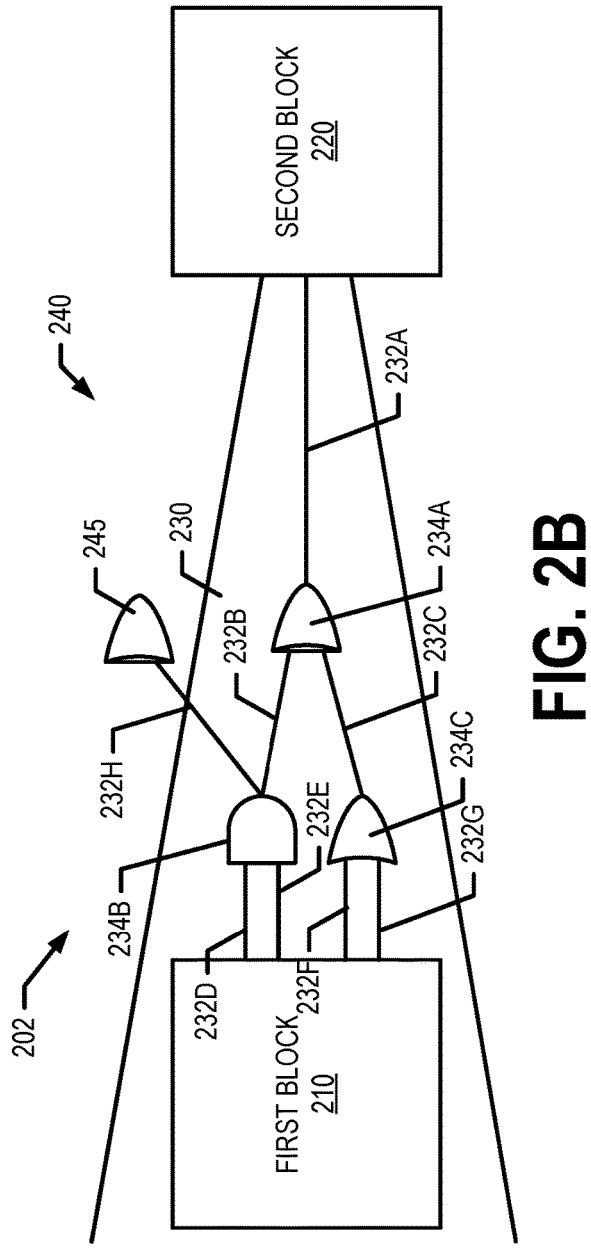
Figure 3:
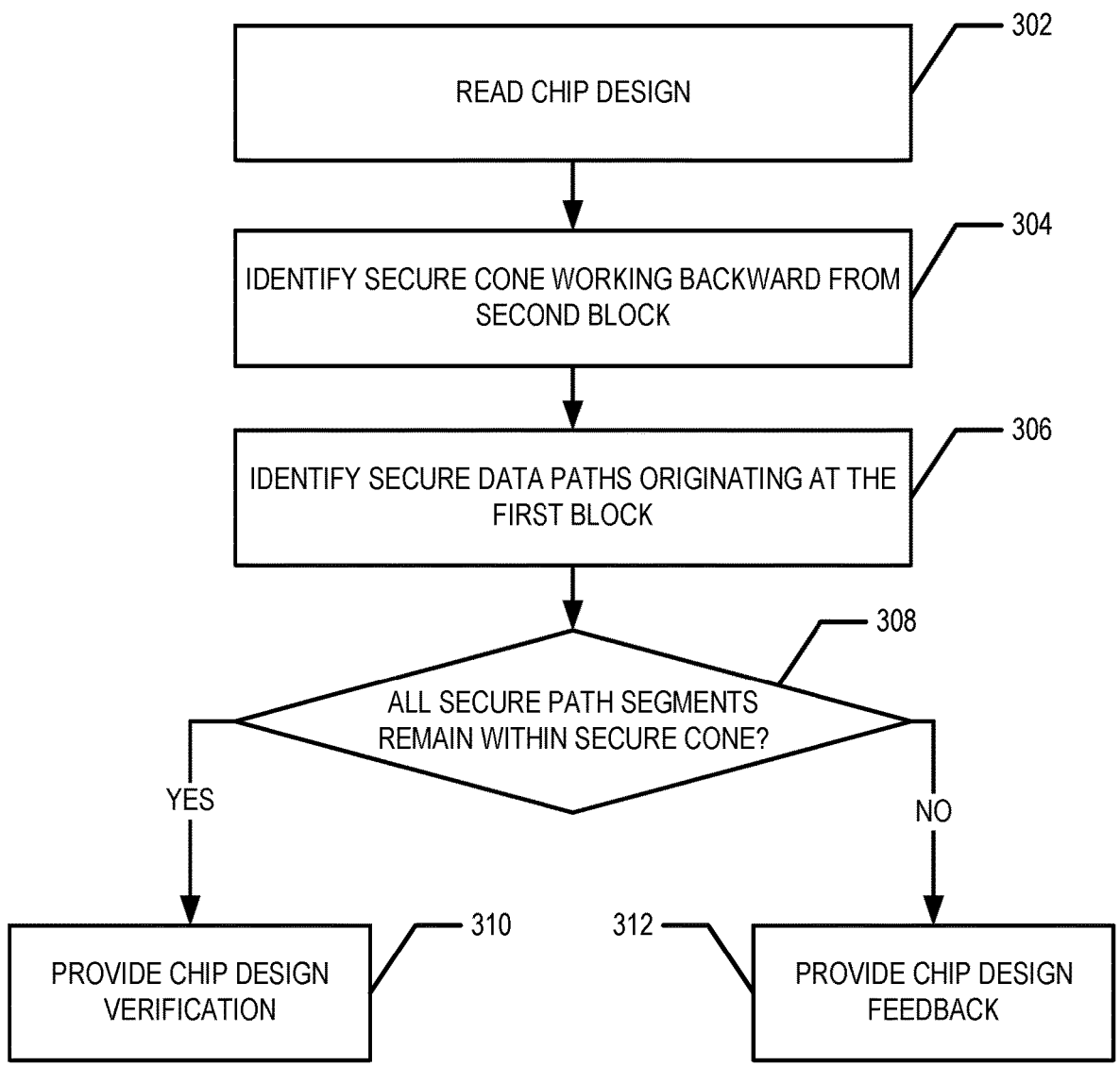
Figure 4:
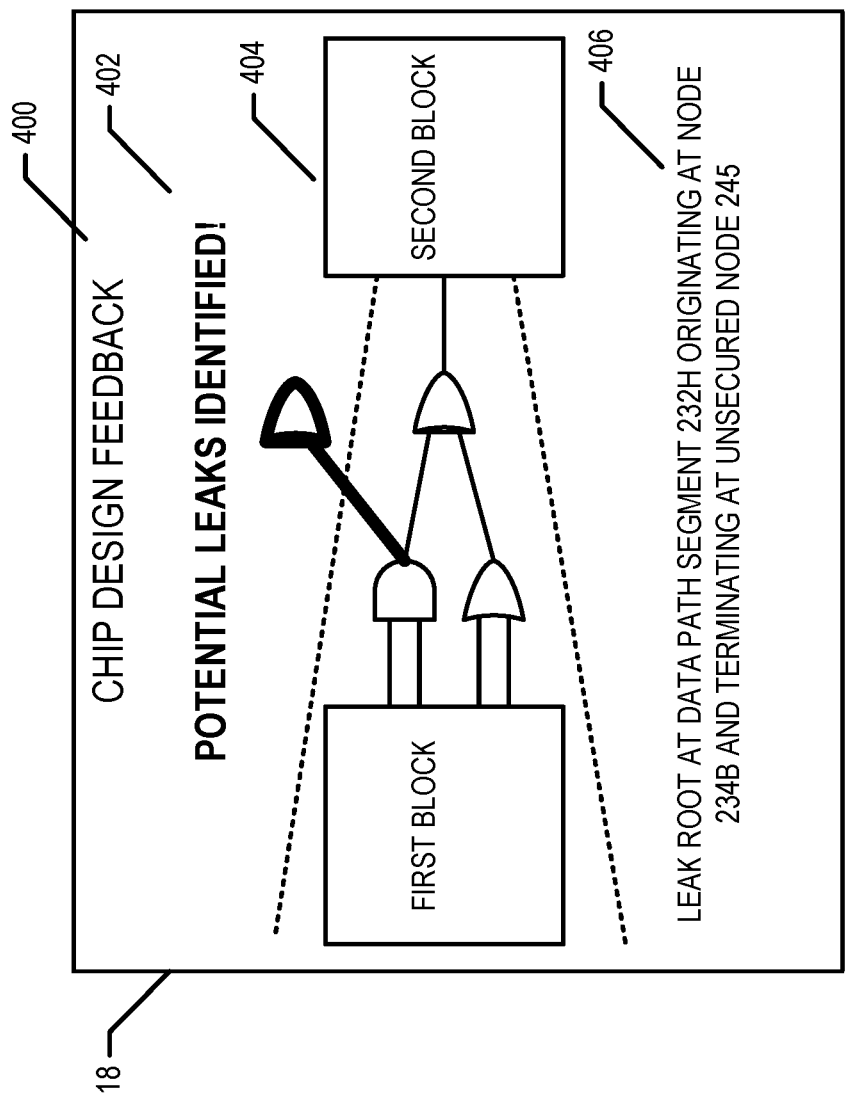

Having thus described certain example embodiments in general terms, reference will hereinafter be made to the accompanying drawings, which are not necessarily drawn to scale, and wherein:

FIG. 1 is a block diagram of an analysis apparatus that may be specifically configured in accordance with an example embodiment;

FIG. 2A is a block diagram illustrating an example secure cone, in accordance with an example embodiment;

FIG. 2B is a block diagram illustrating an example secure cone with a leaked data path segment, in accordance with an example embodiment;

FIG. 3 is a flowchart illustrating operations performed, such as by the analysis apparatus of FIG. 1, to verify a chip design, in accordance with an example embodiment; and FIG. 4 provides an example chip design feedback view of a user interface, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, systems, and computer program products are provided in accordance with an example embodiment in order to determine whether a chip design includes any potential leaks that may compromise the security of secure information/data stored by first hardware module of a computer chip according to the chip design and used by a second hardware module of the computer chip. For example, a computer chip, such as a security chip, may comprise a first hardware module for storing secure information/data and a second hardware module that uses the secure information/data to perform one or more functions. The secure information/data may be communicated from the first hardware module to the second hardware module via data paths, which may include one or more logic gates and/or registers, for example. These data paths provide an opportunity for potential leaks of the secure information/data to untrusted blocks of the computer chip and/or untrusted external users. Thus, these potential leaks provide a security risk. The data paths are defined in the chip design process. Therefore, to prevent the security risk caused by these potential leaks, it is important to identify and correct any potential leaks at the chip design stage. However, there are currently no clear methodologies or industry standards regarding how to go about determining whether any potential leaks are present and identifying any potential leaks so that they may be corrected.

Various embodiments of the present invention provide methods, systems, apparatus, computer program products, and/or the like configured to determine whether a chip design comprises any potential leaks. Various embodiments of the present invention provide methods, systems, apparatus, computer program products, and/or the like configured to identify any potential leaks in a chip design and provide information/data identifying the potential leaks to a user (e.g., chip designer) such that the potential leaks may be corrected at the chip design stage. For example, in various embodiments, an analysis apparatus executing computer program code receives and/or reads a chip design. In various embodiments, the chip design is a netlist design, RTL design, and/or the like. In various embodiments, the chip design comprises a first block corresponding to a first hardware module that is configured to store secure information/data. For example, the first hardware module may be a vault. In various embodiments, the chip design comprises a second block corresponding to a second hardware module that is configured to use the secure information/data to perform one or more functions. For example, the second hardware module may be a cryptographic engine. The chip design may further comprise a plurality of nodes (e.g., representing logic gates, registers, and/or the like) and data path segments. For example, the data path segments may be connections between pairs of nodes, the first block to one or more nodes, and/or one or more nodes to the second block. For example, a data path segment may originate at the first block or a node and terminate at a node or the second block. A series of data path segments connected via nodes provides a data path.

In various embodiments, the analysis apparatus executing computer program code analyzes the chip design to identify a secure cone. For example, by working backwards from the second block, all data paths that terminate at the second block may be identified. As used herein, the term "backwards" refers to a direction that is opposite the direction of the flow of information/data. for example, the secure information/data is provided from the first hardware module to the second hardware module. Thus, the flow of the secure information/data along each data path segment is a direction pointing from the point of origination of the data path segment (e.g., the end of the data path segment that is closer to the first block) toward the point of termination of the data path segment (e.g., the end of the data path segment that is closer to the second block). Thus, working backwards along the data paths includes, starting at the data path segments that terminate at the second block, working backward along the data path segments (e.g., from the termination point toward the origination point of the data path segment) until reaching the origination point of data path segments (e.g., the primary input for the data path segment). The data path segments and nodes of the data paths that terminate at the second block define the secure cone. Any node or data path segment of the chip design that is not part of a data path that terminates at the second block is said to be outside of the secure cone.

In various embodiments, the analysis apparatus executing computer program code analyzes the chip design to identify the data path segments that originate within the secure cone. In various embodiments, the analysis apparatus executing computer program code analyzes the chip design to determine if any of the data path segments that originate at the first block and that are at least partially within the secure cone exit the secure cone. For example, if a data path segment that originates at the first block and is at least partially within the secure cone terminates at a node that is not in the secure cone, then the data path segment exits the secure cone and is a leaked path segment. Information/data identifying any identified leaked path segments may be stored and/or logged.

In various embodiments, the analysis apparatus executing the computer program code provides user perceivable notification of the result of analyzing the chip design. For example, the computer program code may be configured to cause the analysis apparatus to provide (e.g., via a user interface, email, text message, portal, online dashboard, an interactive user interface of a chip design generation program, and/or the like) a chip design verification if the analysis of the chip design indicates that no potential leaks are present in the chip design. The chip design verification may indicate that no potential leaks were identified. For example, the computer program code may be configured to cause the analysis apparatus to provide (e.g., via a user interface, email, text message, portal, online dashboard, an interactive user interface of a chip design generation program, and/or the like) a chip design feedback if the analysis of the chip design indicates that at least one potential leak was identified in the chip design. The chip design feedback may indicate that at least one potential leak was identified. The chip design feedback may further provide information/data identifying the leaked path segments. The user may then use the chip design feedback (e.g., the information/data identifying the leaked path segments) to correct the identified potential leaks and improve the chip design. In various embodiments, the chip design feedback may be configured to be displayed via user interface via a variety of means (e.g., an email, text message, online portal and/or dashboard, pop-up window, interactive user interface of a chip design application/program, and/or the like) or otherwise reported to a user (e.g., chip designer).

In various embodiments, an analysis apparatus performs the analysis of the chip design. In various embodiments, the analysis apparatus may be a user computing entity, computing device, and/or the like. For example, the analysis apparatus may be a desktop computer, laptop, tablet, and/or other computing entity comprising a user interface for receiving input and/or providing user perceivable output (e.g., visual and/or audible output). In an example embodiment, the analysis apparatus is a server in communication with a user computing entity via one or more wired and/or wireless networks. For example, a user may interact with a user computing entity to generate a chip design and/or cause the chip design to be provided such that the analysis apparatus receives the chip design. The analysis apparatus may then perform the analysis of the chip design and provide the chip design verification or chip design feedback such that the user computing entity receives the chip design verification or chip design feedback. The user computing entity may then provide the chip design verification or chip design feedback to the user via a user interface thereof.

FIG. 1 provides an illustration of an example analysis apparatus 10 that can be used in conjunction with various embodiments of the present invention. In an example embodiment, the analysis apparatus 10 may be a server, group of servers, distributed computing system, user computing entity, smartphone, tablet, personal digital assistant (PDA), personal computer, desktop computer, laptop, and/or mobile computing device, and/or other computing system. In an example embodiment, an analysis apparatus 10 may comprise components similar to those shown in the example analysis apparatus 10 diagrammed in FIG. 1. In an example embodiment, the analysis apparatus 10 is configured to receive a chip design (e.g., via one or more networks and/or via user input), analyze the chip design to identify any potential leaks, provide a chip design verification and/or feedback providing the results of the analyzing the chip design, and/or the like. For example, as shown in FIG. 1, the analysis apparatus 10 may comprise a processor 12, memory 14, a user interface 18, a communications interface 16, and/or other components configured to perform various operations, procedures, functions or the like described herein. In at least some example embodiments, the memory 14 is non-transitory. In an example embodiment, the processor 12 may comprise one or more central processing units (CPUs) and one or more graphics processing units (GPUs).

In an example embodiment, the analysis apparatus 10 may be in communication with one or more other apparatuses (e.g., user computing entities and/or the like) via one or more wired and/or wireless networks (e.g., via the communications interface 16). In an example embodiment, the analysis apparatus 10 may receive a chip design and provide a chip design verification and/or feedback such that the one or more other apparatuses receive the chip design verification and/or feedback via the one or more wired and/or wireless networks. For example, the analysis apparatus 10 may be configured (e.g., via communications interface 16) to provide (e.g., transmit) and/or receive electronic communications via wireless or wired networks including, for example, a wired or wireless Personal Area Network (PAN), Local Area Network (LAN), Metropolitan Area Network (MAN), Wide Area Network (WAN), cellular network, and/or the like.

Certain example embodiments of the analysis apparatus 10 are described in more detail below with respect to FIG. 1.

II. Example Operation

Various embodiments provide methods, systems, apparatus, computer program products, and/or the like configured to determine whether a chip design comprises any potential leaks. Various embodiments of the present invention provide methods, systems, apparatus, computer program products, and/or the like configured to identify any potential leaks in a chip design and provide information/data identifying the potential leaks to a user (e.g., chip designer) such that the potential leaks may be corrected at the chip design stage. In various embodiments, a chip security verification tool is configured to analyze chip designs that include multi-cycle design paths. In various embodiments, the chip security verification tool is configured to analyze chip designs to identify any possible secure information/data leakages at the bit level. In various embodiments, the chip security verification tool provides a chip design verification or a chip design feedback including meaningful feedback that may be used to correct any identified potential leaks in real time or near real time with respect to the chip design being read by the chip security verification tool. For example, the chip design verification or chip design feedback may be provided for review by a user (e.g., chip designer) in less than a minute, less than thirty seconds, less than fifteen seconds, less than five seconds, and/or the like after the chip design is read by the chip security verification tool.

FIG. 2A provides a schematic illustration of a chip design 200 comprising a first block 210 and a second block 220. The first block 210 corresponds to first hardware module configured to store secure information/data. For example, the first hardware module may be a vault and/other secure data storage. The second block 220 corresponds to a second hardware module configured to use the secure information/data to perform one or more functions. For example, the second hardware module may be a cryptographic engine and/or other processing circuitry that makes use of secure information/data to perform one or more functions. A secure cone 230 may be defined that includes all of the data paths that terminate at the second block 220.

FIG. 2B provides a schematic illustration of a portion of simple example chip design 202. The portion of the example chip design 202 comprises a first block 210 and a second block 220. A secure cone 230 is defined to include all of the data paths that terminate at the second block 220. The data paths comprise a plurality of data path segments 232 (e.g., 232A-H) and nodes 234 (e.g., 234A-C). For example, the nodes 234 may represent logic gates and/or registers of the chip design and the data path segments 232 may be connections between the nodes 234 (e.g., may originate at one node and terminate at another node). For example, the data path segments 232 may represent traces, electrical communication corridors, and/or the like connect the logic gates and/or registers of a computer chip. The portion of the example chip design 202 comprises a leaked path segment 232H which originates at a node 234B that is within the secure cone 230 and terminates at unsecured node 245 that is located in an unsecured portion 240 of the chip design (e.g., a portion of the chip design that is exterior to the secure cone 230). In various embodiments, the unsecured node 245 may be a block that is located outside the secure cone 230 (e.g., is not the first block 210 or the second block 220).

FIG. 3 provides a flowchart illustrating example processes, procedures, operations, and/or the like that may be performed, for example, by the analysis apparatus 10 to determine if potential leaks are present in a chip design and identify any leaked path segments. Starting at step/operation 302, a chip design is read. For example, the analysis apparatus 10 may receive a chip design (e.g., via processor 12, memory 14, communication interface 16, and/or the like) generated on and provided by a user computing entity. In another example, the analysis apparatus 10 may receive a chip design (e.g., via processor 12, memory 14, user interface 18, and/or the like) generated based on, for example, user input received via the user interface 18. The analysis apparatus 10 may execute (e.g., via processor 12) computer program code (possibly stored in memory 14) corresponding to a chip design verification tool. In various embodiments, execution of the computer program code corresponding to the chip design verification tool by the analysis apparatus 10 causes the analysis apparatus 10 (e.g., processor 12) to read the chip design. In various embodiments, the chip design may be provided as an RTL design, netlist design, and/or the like. In an example embodiment, the chip design is read in from a file. In an example embodiment, the chip design verification tool is part of a program that a user (e.g., chip designer) may use to generate a chip design and the chip design may be read in from the working memory (e.g., cache) corresponding to the program used to generate the chip design.

At step/operation 304, the secure cone is identified. For example, the analysis apparatus 10 may execute (e.g., via processor 12) computer program code (possibly stored in memory 14) corresponding to a chip design verification tool that 10 causes the analysis apparatus 10 (e.g., processor 12) to identify a secure cone of the chip design. For example, to identify the secure cone, the first block 210 corresponding to a first hardware module configured to the store secure information/data may be identified and the second block 220 corresponding to a second hardware module configured to use the secure information/data to perform one or more functions may be identified. The data paths that terminate at the second block 220 may then be identified. For example, each data path segment 232 that terminates at the second block 220 is identified. The data path segments 232 that terminate at the second block 220 may then be followed backward (e.g., backward along the data path) to the node 234 at which the data path segments 232 originate. The data path segments 233 that terminate at the nodes 234 may then be identified and followed backward to the origination point of those data path segments (e.g., either another node 234, the first block 210, another primary input), until all of the data paths terminating at the nodes 234 are followed back to their origination point (e.g., primary input). These data paths define the secure cone 230.

For example, the secure cone 230 comprises the second block 220, and the nodes 234 and data path segments 232 that provide data paths that may be traced backward from the second block 220 to their origination point and/or primary input (which may be the first block 210). For example, according to the portion of the example chip design 202 shown in FIG. 2B, the data paths traced backwards from the second block 220 to the first block 210 consist of (a) data path segment 232A (which terminates at the second block 220 and originates at node 234A), node 234A (which is the termination point for data path segment 232A and the origination point of data path segment 232B), data path segment 232B (which originates at node 234A and terminates at node 234B), node 234B (which is the termination point for data path segment 232B and the origination point of data path segment 232D), and data path segment 232D (which originates at node 234B and terminates at the first block 210); (b) data path segment 232A (which terminates at the second block 220 and originates at node 234A), node 234A (which is the termination point for data path segment 232A and the origination point of data path segment 232B), data path segment 232B (which originates at node 234A and terminates at node 234B), node 234B (which is the termination point for data path segment 232B and the origination point of data path segment 232E), and data path segment 232E (which originates at node 234B and terminates at the first block 210); (c) data path segment 232A (which terminates at the second block 220 and originates at node 234A), node 234A (which is the termination point for data path segment 232A and the origination point of data path segment 232C), data path segment 232C (which originates at node 234A and terminates at node 234C), node 234C (which is the termination point for data path segment 232C and the origination point of data path segment 232F), and data path segment 232F (which originates at node 234C and terminates at the first block 210); and (d) data path segment 232A (which terminates at the second block 220 and originates at node 234A), node 234A (which is the termination point for data path segment 232A and the origination point of data path segment 232C), data path segment 232C (which originates at node 234A and terminates at node 234C), node 234C (which is the termination point for data path segment 232C and the origination point of data path segment 232G), and data path segment 232G (which originates at node 234C and terminates at the first block 210). Thus, the secure cone 230 may be identified (e.g., by the analysis apparatus 10) as consisting of the second block 220, data path segments 232A-G, and nodes 234A-C. In various embodiments, the data paths may include multi-cycle paths.

In an example embodiment, the chip design is used to define a graph representing the chip design. For example, the graph may comprise a source (e.g., the first block 210), a sink (e.g., the second block 220), a number of vertices (e.g., the nodes 234), and a number of edges (e.g., data path segments 232) connecting the source to one or more vertices, one or more vertices to one another, and/or one or more vertices to the sink. In an example embodiment, the data paths used to define the secure cone 230 may be determined and/or identified using a graph traversal algorithm to traverse backward through the graph from the sink (e.g., the second block 220) to the source (e.g., the first block 210).

Continuing with FIG. 3, at step/operation 306, the data path segments 232 that are within the secure cone 230 and that originate at the first block 210 are identified. For example, the analysis apparatus 10 may execute (e.g., via processor 12) computer program code (possibly stored in memory 14) corresponding to a chip design verification tool that 10 causes the analysis apparatus 10 (e.g., processor 12) to identify the data path segments 232 that are within the secure cone 230 and that originate at the first block 210. For example, a data path segment 232 may be determined to originate within the secure cone if the data path segment 232 originates and/or terminates at a node 234 that is within the secure cone 230 and/or the second block 220. In an example embodiment, the data path segments that originate within the secure cone 230 and that originate at the first block 210 are identified by tracing data paths forward from the first block 210 toward the second block 220. Each data path segment 232 that originates at the first block 210 or a node 234 along the data paths being traced forward from the first block 210 toward the second block 220 is identified as a data path segment 232 that originates within the secure cone 230. In an example embodiment, all of the data path segments that originate at the first block 210 and are part of a data path at least partially within the secure cone secure cone 230 are identified. Each of the data path segments 232 that are at least partially within the secure cone 230 have the potential to carry and/or communicate secure information/data. In the illustrated portion of the example chip design 202 of FIG. 2B, data path segments 232A-H are identified as data path segments that are at least partially within the secure cone 230 and are part of a data path that originates at the first block 210. Data path segments that are at least partially within the secure cone 230 are referred to herein as secure path segments. Thus, in the illustrated portion of the example chip design 202, data path segments 232A-H are secure path segments since they each originate within the secure cone 230.

In an example embodiment, the chip design is used to define a graph representing the chip design. For example, the graph may comprise a source (e.g., the first block 210), a sink (e.g., the second block 220), a number of vertices (e.g., the nodes 234), and a number of edges (e.g., data path segments 232) connecting the source to one or more vertices, one or more vertices to one another, and/or one or more vertices to the sink. In an example embodiment, the data path segments that originate within the secure cone 230 (e.g., the secure path segments) are identified using a graph traversal algorithm to traverse forward through the graph from the source (e.g., the first block 210) to the sink (e.g., the second block 220).

Returning to FIG. 3, at step/operation 308, it is determined whether all of the secure path segments remain within the secure cone 230. For example, it may be determined whether all of the secure path segments (data path segments that originate and/or are at least partially within the secure cone 230) terminate within the secure cone 230 (e.g., at the second block 220 or at a node 234A-C within the secure cone 230). For example, the analysis apparatus 10 may execute (e.g., via processor 12) computer program code (possibly stored in memory 14) corresponding to a chip design verification tool that 10 causes the analysis apparatus 10 (e.g., processor 12) to determine whether all of the secure path segments (data path segments that originate within the secure cone 230) terminate within the secure cone 230 (e.g., at the second block 220 or at a node 234A-C within the secure cone 230). For example, the analysis apparatus 10 may execute (e.g., via processor 12) computer program code (possibly stored in memory 14) corresponding to a chip design verification tool that 10 causes the analysis apparatus 10 (e.g., processor 12) to determine whether all of the data path segments that originate at the first block 210 and that are at least partially within the secure cone 230 terminate within the secure cone 230 (e.g., at the second block 220 or at a node 234A-C within the secure cone 230). In the illustrated portion of the example chip design 202, it may be determined that secure path segments 232A-G remain within the secure cone 230 as each of secure path segments 232A terminate at the second block 220 or one of the nodes 234A-C within the secure cone. In the illustrated portion of the example chip design 202, it may be determined that secure path segment 232H does not remain within the secure cone 230 as the secure path segment 232H terminates at unsecured node 245 that is located in an unsecured portion 240 of the chip design (e.g., a portion of the chip design that is exterior to the secure cone 230). Thus, secure path segment 232H is a leaked path segment since the secure path segment 232H exits the secure cone 230. For example, leaked path segment 232H provides an opportunity for secure information/data to be leaked while the secure information/data is being communicated from the first block 210 to the second block 220. In an example embodiment, it may be determined that secure path segment 232H is a leaked segment by determining that secure path segment 232H terminates at unsecured node 245. In an example embodiment, it may be determined that secure path segment 232H is a leaked path segment by determining that secure path segment 232H is not part of any of the data paths that were traced backward from the second block 220 to the first block 210. Information/data identifying the leaked path segment 232H may be logged, cached, and/or the like (e.g., stored in memory 214). For example, the information/data identifying the leaked path segment 232H may comprise a list of signals in the RTL (e.g., corresponding to path segments) that have logical connections between them (e.g., corresponding to nodes that connect the path segments), with one of the signals (e.g., the final signal of the list or an otherwise highlighted signal of the list) that is outside of the secure path.

In an example embodiment, step/operations 306 and 308 may be performed in parallel or in series. For example, in one embodiment, a first secure path segment may be identified and then it may be determined whether the first secure path segment remains within the secure cone 230 (e.g., terminates within the secure cone) and then a second secure path segment may be identified and so forth. In another example, in one embodiment all of the secure path segments are identified and then it is determined whether the secure path segments each remain within the secure cone.

Responsive to determining that all of the secure path segments remain within the secure cone 230, the process continues to step/operation 310. At step/operation 310, it is determined (e.g., by the analysis apparatus 10) that the chip design is verified and a chip design verification is provided. For example, the analysis apparatus 10 may execute (e.g., via processor 12) computer program code (possibly stored in memory 14) corresponding to a chip design verification tool that 10 causes the analysis apparatus 10 (e.g., processor 12) to determine that the chip design is verified (e.g., no potential leaks are identified) and to generate and provide a chip design verification. In an example embodiment, the chip design verification provides an indication that no potential leaks (e.g., no leaked path segments) were identified in the chip design. In an example embodiment, the analysis apparatus 10 provides the chip design verification via an interactive user interface provided via the user interface 18 of the analysis apparatus 10. In an example embodiment, the analysis apparatus 10 may provide (e.g., transmit) the chip design verification (e.g., via one or more wired and/or wireless networks using communication interface 16) such that the user computing entity that provided the chip design may receive the chip design verification and provide the chip design verification via a user interface thereof. In an example embodiment, the chip design verification may be provided by email, text message, a portal or online dashboard, an interactive user interface of the program used to design and/or generate the chip design, and/or the like such that the chip designer may receive, review, and/or the like the chip design verification.

Responsive to determining that at least one of the secure path segments exits the secure cone 230 (e.g., at least one of the secure path segments is a leaked path segment), the process continues to step/operation 312. At step/operation 312, it is determined (e.g., by the analysis apparatus 10) that the chip design includes at least one potential leak and a chip design feedback is provided. For example, the analysis apparatus 10 may execute (e.g., via processor 12) computer program code (possibly stored in memory 14) corresponding to a chip design verification tool that 10 causes the analysis apparatus 10 (e.g., processor 12) to determine that at least one potential leak is identified and to generate and provide a chip design feedback. In an example embodiment, the chip design feedback provides an indication at least one potential leak (e.g., at least one leaked path segment) was identified in the chip design. In various embodiments, the chip design feedback comprises and/or provides information/data identifying the root of the identified potential leaks (e.g., the identified leaked data segment(s)). For example, the chip design feedback may comprise and/or provide information/data identifying each identified leaked data segment. For example, the chip design feedback may comprise a list of signal names, possibly with reference to the source files and line numbers corresponding thereto. For example, the chip design feedback may include a plurality of signals in the RTL, for example, that have a logical impact on the identified potential leak. For example, the chip design feedback may comprise a visual representation of the graph path from its origination point (e.g., primary input) to the leaked data segment. For example, the chip design feedback may be configured to enable the designer to quickly and efficiently identify the root RTL signal that caused the leak and efficiently fix it such that the leak is prevented. In various embodiments, the analysis apparatus 10 provides the chip design feedback via an interactive user interface provided via the user interface 18 of the analysis apparatus 10. In an example embodiment, the analysis apparatus 10 may provide (e.g., transmit) the chip design feedback (e.g., via one or more wired and/or wireless networks using communication interface 16) such that the user computing entity that provided the chip design may receive the chip design feedback and provide the chip design feedback via a user interface thereof. In an example embodiment, the chip design feedback may be provided by email, text message, a portal or online dashboard, an interactive user interface of the program used to design and/or generate the chip design, and/or the like such that the chip designer may receive, review, and/or the like the chip design feedback. The chip designer may then modify, revise, correct, and/or the like the chip design based on the information/data identifying the identified leaked data segment(s) so that any potential leaks enabled by the identified leaked data segment(s) are removed. For example, based on the information/data identifying the identified leaked data segment(s), the chip design may be modified, revised, corrected, and/or the like to prevent the mixing of secure information/data and non-secure information/data within the chip, which may result in secure information/data being provided to untrusted blocks and/or untrusted external users.

FIG. 4 illustrates an example chip design feedback 400 provided via a user interface 18 of the analysis apparatus 10, in an example embodiment. In an example embodiment, the chip design feedback 400 includes an indication 402 that at least one potential leak was identified. In various embodiments, the chip design feedback 400 provides information/data identifying the root of any identified potential leaks. For example, in an example embodiment, the chip design feedback 400 includes a graphical representation 404 of the chip design that graphically illustrates information/data identifying the identified leaked path segment(s). For example, in an example embodiment, the chip design feedback 400 includes a written or audible portion 406 that describes and/or identifies the identified leaked path segment(s). The chip design feedback 400 may therefore provide a user (e.g., a chip designer) with information/data that identifies the identified leaked path segments and/or that otherwise pinpoints the root of any identified potential leaks in the chip design so that the chip designer may efficiently correct, modify, revise, and/or the like the chip design to remove the identified potential leaks.

Technical Advantages

Various embodiments provide a technical solution to the technical problem of designing computer chips (e.g., security chips and/or the like) that do not include potential leakage paths that may cause secure information/data to be compromised. For example, various embodiments provide a technical solution to the technical problem of designing computer chips that do not include leakage paths and that ensure that secure information/data is not leaked when being communicated between a first hardware module of a computer chip and a second hardware module of a computer chip. In particular, various embodiments provide methods, apparatus, systems, computer program products, and/or the like configured to perform a leak test on a chip design and determine whether any leakage paths exist in the chip design. In various embodiments, a computer chip, also referred to herein as a chip, may be an integrated circuit, a wafer of semiconductor material embedded with integrated circuitry, and/or the like. In various embodiments, the chip is a security chip and/or comprises security elements. For example, the chip may be and/or comprise elements of a flip flop, static random access memory (SRAM), and/or the like, in various embodiments. For example, the chip may comprise a first hardware module that stores secure information/data and a second hardware module that uses the secure information/data to perform one or more functions. For example, the first hardware module may be a vault or other secure storage hardware module. For example, the second hardware module may be a trusted block. In an example embodiment, the second hardware module is a cryptographic engine. Thus, various embodiments provide an improvement to the technical field of secure chip design and development.

Moreover, in various embodiments, when a potential leak is identified, information/data identifying the root cause (e.g., the leaked path segment) of the potential leak is provided (e.g., via a user interface and/or the like such that a chip designer may review the information/data). Thus, various embodiments provide a chip designer with the information/data necessary to efficiently correct, modify, revise, and/or the like the chip design to remove any identified potential leaks. Thus, veracious embodiments provide further improvements to the technical field of secure chip design and development.

III. Example Apparatus

The analysis apparatus 10 of an example embodiment may be embodied by or associated with a variety of computing devices including, for example, a mobile phone, a personal digital assistant (PDA), a watch, a camera, a desktop computer, a tablet, a laptop, a server, a personal computer, a computer workstation, a plurality of networked computing devices or the like, that are configured to analyze a chip design. In this regard, FIG. 1 depicts an example analysis apparatus 10 that may be embodied by various computing devices including those identified above. As shown, the analysis apparatus 10 of an example embodiment may include, may be associated with, or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the analysis apparatus 10. The memory device 14 may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor 12). The memory device 14 may be configured to store information, data, content, applications, instructions, computer program code, or the like for enabling the apparatus to carry out various functions in accordance with an example embodiment of the present invention. For example, the memory device 14 could be configured to buffer input data for processing by the processor. Additionally or alternatively, the memory device 14 could be configured to store instructions, computer program code, and/or the like for execution by the processor 12.

As described above, the analysis apparatus 10 may be embodied by a computing device. However, in some embodiments, the analysis apparatus 10 may be embodied as a chip or chip set. In other words, the analysis apparatus 10 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The analysis apparatus 10 may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor 12 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12 may include one or more processing cores configured to perform independently. A multi-core processor may enable multiprocessing within a single physical package. Additionally or alternatively, the processor 12 may include one or more processors configured in tandem via the bus to enable independent execution of instructions, pipelining and/or multithreading.

In an example embodiment, the processor 12 may be configured to execute instructions and/or computer program code stored in the memory device 14 or otherwise accessible to the processor 12. Alternatively or additionally, the processor 12 may be configured to execute hard coded functionality. As such, whether configured by hardware or software methods, or by a combination thereof, the processor 12 may represent an entity (e.g., physically embodied in circuitry) capable of performing operations according to an embodiment of the present invention while configured accordingly. Thus, for example, when the processor 12 is embodied as an ASIC, FPGA or the like, the processor 12 may be specifically configured hardware for conducting the operations described herein. Alternatively, as another example, when the processor 12 is embodied as an executor of software instructions and/or computer program code, the instructions and/or computer program code may specifically configure the processor 12 to perform the algorithms and/or operations described herein when the instructions and/or computer program code are executed. However, in some cases, the processor 12 may be a processor of a specific device (e.g., a pass-through display or a mobile terminal) configured to employ an embodiment of the present invention by further configuration of the processor 12 by instructions and/or computer program code for performing the algorithms and/or operations described herein. The processor 12 may include, among other things, a clock, an arithmetic logic unit (ALU) and logic gates configured to support operation of the processor.

In some embodiments, the analysis apparatus 10 may include a user interface 18 that may, in turn, be in communication with the processor 12 to provide output to the user, such as a chip design verification and/or a chip design feedback, and, in some embodiments, to receive an indication of a user input (e.g., selecting, providing, and/or generating a chip design). As such, the user interface may include one or more output devices such as a display, speaker, and/or the like and, in some embodiments, may also include one or more input devices such as a keyboard, a mouse, a joystick, a touch screen, touch areas, soft keys, a microphone, or other input/output mechanisms. Alternatively or additionally, the processor 12 may comprise user interface circuitry configured to control at least some functions of one or more user interface elements such as a display and, in some embodiments, a speaker, ringer, microphone and/or the like. The processor 12 and/or user interface circuitry comprising the processor may be configured to control one or more functions of one or more user interface elements through computer program instructions (e.g., software and/or firmware) stored on a memory accessible to the processor 12 (e.g., memory device 14 and/or the like).

The analysis apparatus 10 may optionally include a communication interface 16. The communication interface may be any means such as a device or circuitry embodied in either hardware or a combination of hardware and software that is configured to receive and/or transmit data from/to a network and/or any other device or module in communication with the analysis apparatus 10. In this regard, the communication interface 16 may include, for example, an antenna (or multiple antennas) and supporting hardware and/or software for enabling communications with a wireless communication network. Additionally or alternatively, the communication interface 16 may include the circuitry for interacting with the antenna(s) to cause transmission of signals via the antenna(s) or to handle receipt of signals received via the antenna(s). In some environments, the communication interface 16 may alternatively or also support wired communication. As such, for example, the communication interface may include a communication modem and/or other hardware/software for supporting communication via cable, digital subscriber line (DSL), universal serial bus (USB), or other mechanisms.

IV. Apparatus, Methods, and Computer Program Products

As described above, FIG. 3 illustrates a flowchart of an analysis apparatus 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by instructions and/or computer program code. In this regard, the instructions and/or computer program code which embody the procedures described above may be stored by the memory device 14 of an analysis apparatus employing an embodiment of the present invention and executed by the processor 12 of the analysis apparatus. As will be appreciated, any such instructions and/or computer program code may be loaded onto a computer or other programmable apparatus (e.g., hardware) to produce a machine, such that the resulting computer or other programmable apparatus implements the functions specified in the flowchart blocks. These instructions and/or computer program code may also be stored in a computer-readable memory that may direct a computer or other programmable apparatus to function in a particular manner, such that the instructions and/or computer program code stored in the computer-readable memory produce an article of manufacture the execution of which implements the function specified in the flowchart blocks. The instructions and/or computer program code may also be loaded onto a computer or other programmable apparatus to cause a series of operations to be performed on the computer or other programmable apparatus to produce a computer-implemented process such that the instructions and/or computer program code which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for verifying a chip design for a computer chip, the method comprising:
reading, by an analysis apparatus, a chip design, the chip design comprising a first block corresponding to a first hardware module, a second block corresponding to a second hardware module, a plurality of nodes, and a corresponding plurality of data path segments, wherein each data path segment connects a pair of nodes or connects a node to one of the first or second blocks;
by tracing backwards along data paths that terminate at the second block, identifying, by the analysis apparatus, a secure cone, wherein the secure cone comprises all data path segments of the data paths that terminate at the second block and any nodes that connect the data path segments of the secure cone;
based on the secure cone, defining, by the analysis apparatus, at least one of (a) a set of nodes that are located within the secure cone or (b) a set of data paths segments that are located within the secure cone;
identifying, by the analysis apparatus, data paths that originate at the first block and that are at least partially within the secure cone;
determining, by the analysis apparatus and based at least in part on the at least one of (a) a set of nodes that are located within the secure cone or (b) a set of data paths segments that are located within the secure cone, whether any of the data paths that originate at the first block and are at least partially within the secure cone terminate at a node that is not in the secure cone by tracing forward along each of the data paths that originate at the first block and that are at least partially within the secure cone from the first block to determine whether each of the data paths terminate at the second block;
responsive to determining that each of the data paths that originate at the first block and are at least partially within the secure cone terminate at the second block, determining, by the analysis apparatus, that the chip design is verified; and responsive to determining that at least one of the data paths that originate at the first block and are at least partially within the secure cone does not terminate at the second block:
determining, by the analysis apparatus, that the chip design has a potential leak, and
causing, by the analysis apparatus, display of an indication of the potential leak.

2. The method of claim 1, wherein the first hardware module is a vault.

3. The method of claim 1, wherein the second hardware module is a cryptographic engine.

4. The method of claim 1, wherein the data paths are paths configured for the communication of secure information from the first hardware module to the second hardware module.

5. The method of claim 1, wherein the chip design is a netlist design or a register-transfer level (RTL) design.

6. The method of claim 1, wherein the nodes represent logic gates and/or registers of the chip design and the data path segments are edges that connect the nodes.

7. The method of claim 1, further comprising, responsive to determining that the chip design is verified, providing a chip design verification indicating that no potential leaks were identified.

8. The method of claim 1, further comprising, responsive to determining that the chip design has a potential leak, providing a chip design feedback indicating that at least one potential leak was identified.

9. The method of claim 8, wherein the chip design feedback comprises information identifying at least one leaked path segment that is the root of the at least one potential leak.

10. The method of claim 1, wherein determining whether any of the data paths that originate at the first block and are at least partially within the secure cone terminate at a node that is not in the secure cone comprises tracing each of the data paths that originate at the first block and that are at least partially within the secure cone forward from the first block to a respective termination point to determine whether any of the data paths that originate at the first block and are at least partially within the secure cone terminate at a node that is not in the secure cone, wherein the respective termination point is one of (a) the second block or (b) a node or a data path segment that is not a member of a respective one of the at least one of (a) a set of nodes that are located within the secure cone or (b) a set of data paths segments that are located within the secure cone.

11. An apparatus comprising at least one processor and at least one memory storing computer program code, the at least one memory and the computer program code configured to, with the processor, cause the apparatus to at least:
read a chip design, the chip design comprising a first block corresponding to a first hardware module, a second block corresponding to a second hardware module, a plurality of nodes, and a corresponding plurality of data path segments, wherein each data path segment connects a pair of nodes or connects a node to one of the first or second blocks;
by tracing backwards along data paths that terminate at the second block, identify a secure cone, wherein the secure cone comprises all data path segments of the data paths that terminate at the second block and any nodes that connect the data path segments of the secure cone;
based on the secure cone, define at least one of (a) a set of nodes that are located within the secure cone or (b) a set of data paths segments that are located within the secure cone;
identify data paths that originate at the first block and are at least partially within the secure cone;
determine, based at least in part on the at least one of (a) a set of nodes that are located within the secure cone or (b) a set of data paths segments that are located within the secure cone, whether any of the data paths that originate at the first block and that are at least partially within the secure cone terminate at a node that is not in the secure cone by tracing forward along each of the data paths that originate at the first block and that are at least partially within the secure cone from the first block to determine whether each of the data paths terminate at the second block;
responsive to determining that of the data paths that originate at the first block and are at least partially within the secure cone terminate at the second block, determine that the chip design is verified; and
responsive to determining that at least one of the data paths that originate at the first block and are at least partially within the secure cone does not terminate at the second block:
determine that the chip design has a potential leak, and
cause display of an indication of the potential leak.

12. The apparatus of claim 11, wherein the first hardware module is a vault.

13. The apparatus of claim 11, wherein the second hardware module is a cryptographic engine.

14. The apparatus of claim 11, wherein the data paths are paths configured for the communication of secure information from the first hardware module to the second hardware module.

15. The apparatus of claim 11, wherein the chip design is a netlist design or a register-transfer level (RTL) design.

16. The apparatus of claim 11, wherein the nodes represent logic gates of the chip design and the data path segments are edges that connect the nodes.

17. The apparatus of claim 11, wherein the at least one memory and the computer program code are further configured to, with the processor, cause the apparatus to at least, responsive to determining that the chip design is verified, provide a chip design verification indicating that no potential leaks were identified.

18. The apparatus of claim 11, wherein the at least one memory and the computer program code are further configured to, with the processor, cause the apparatus to at least, responsive to determining that the chip design has a potential leak, provide a chip design feedback indicating that at least one potential leak was identified.

19. A non-transitory, machine-readable storage medium comprising a plurality of instructions that, when executed with a processor of an apparatus, cause the apparatus to:
read a chip design, the chip design comprising a first block corresponding to a first hardware module, a second block corresponding to a second hardware module, a plurality of nodes, and a corresponding plurality of data path segments, wherein each data path segment connects a pair of nodes or connects a node to one of the first or second blocks;
by tracing backwards along data paths that terminate at the second block, identify a secure cone, wherein the secure cone comprises all data path segments of the data paths that terminate at the second block and any nodes that connect the data path segments of the secure cone;

based on the secure cone, define at least one of (a) a set of nodes that are located within the secure cone or (b) a set of data paths segments that are located within the secure cone;

identify data paths that originate at the first block and are at least partially within the secure cone;

determine, based at least in part on the at least one of (a) a set of nodes that are located within the secure cone or (b) a set of data paths segments that are located within the secure cone, whether any of the data paths that originate at the first block and that are at least partially within the secure cone terminate at a node that is not in the secure cone by tracing forward along each of the data paths that originate at the first block and that are at least partially within the secure cone from the first block to determine whether each of the data paths terminate at the second block;

responsive to determining that each of the data paths that originate at the first block and are at least partially within the secure cone terminate at the second block, determine that the chip design is verified; and responsive to determining that at least one of the data paths that originate at the first block and are at least partially within the secure cone does not terminate at the second block:
determine that the chip design has a potential leak, and cause display of an indication of the potential leak.

20. The non-transitory, machine-readable storage medium of claim 19, wherein the instructions, when executed with the processor of the apparatus, further cause the apparatus to:

responsive to determining that the chip design is verified, provide a chip design verification indicating that no potential leaks were identified; and responsive to determining that the chip design has a potential leak, provide a chip design feedback indicating that at least one potential leak was identified, wherein the chip design feedback comprises information identifying at least one leaked path segment that is the root of the at least one potential leak.

* * * * *